(12) United States Patent
Klein

(10) Patent No.: US 7,416,147 B2
(45) Date of Patent: Aug. 26, 2008

(54) REEL UNIT FOR USE IN A FISHING ROD, HOLDER FOR A REEL UNIT AND FISHING ROD COMPRISING SAID REEL UNIT

(75) Inventor: Helmut Klein, Egger, Strasse 47, Metten (DE) 94526

(73) Assignees: Helmut Klein, Metten (DE); CWB Innovation GmbH, Hamburg (DE)

( * ) Notice: Subject to any disclaimer, the term of this patent is extended or adjusted under 35 U.S.C. 154(b) by 79 days.

(21) Appl. No.: 10/578,310

(22) PCT Filed: Nov. 2, 2004

(86) PCT No.: PCT/DE2004/002429

§ 371 (c)(1),
(2), (4) Date: May 4, 2006

(87) PCT Pub. No.: WO2005/043996

PCT Pub. Date: May 19, 2005

(65) Prior Publication Data

US 2007/0114316 A1    May 24, 2007

(30) Foreign Application Priority Data

Nov. 5, 2003  (DE)  ................. 103 52 161
Dec. 10, 2003 (DE)  ................. 103 58 083
Dec. 10, 2003 (DE)  ................. 103 58 084

(51) Int. Cl.
*A01K 89/01*  (2006.01)

(52) U.S. Cl. ................... 242/223; 242/229; 242/279; 242/316; D22/140

(58) Field of Classification Search ............... 242/223, 242/229, 241, 274, 279, 316, 323; D22/140, D22/141

See application file for complete search history.

(56) References Cited

U.S. PATENT DOCUMENTS

| | | | |
|---|---|---|---|
| 1,398,197 A | 11/1921 | Moses | |
| 2,623,704 A | 12/1952 | Bergman et al. | |
| 3,072,356 A | 1/1963 | Leuthner | |
| 3,944,159 A * | 3/1976 | Dobbs | 242/229 |
| 4,106,717 A * | 8/1978 | Thiel | 242/229 |
| 4,223,854 A | 9/1980 | Karlsson et al. | |
| 4,747,560 A | 5/1988 | Karlsson et al. | |
| 5,131,596 A * | 7/1992 | Sato | 242/279 |
| 5,139,213 A * | 8/1992 | Furomoto | 242/279 |
| 5,482,220 A | 1/1996 | Hashimoto et al. | |
| 5,833,155 A * | 11/1998 | Murayama | 242/279 |
| 5,873,536 A * | 2/1999 | Beldycki | 242/323 |
| 5,947,399 A | 9/1999 | Oh et al. | |

FOREIGN PATENT DOCUMENTS

FR    2691044 A1 * 11/1993

* cited by examiner

*Primary Examiner*—Emmanuel M Marcelo
(74) *Attorney, Agent, or Firm*—Hoffman, Wasson & Gitler PC

(57) ABSTRACT

The invention relates to a new type of reel unit for a fishing line for use on a fishing rod, made up of a housing, a spool rotatably mounted on the housing that can be rotated via a gear unit by means of a hand crank for reeling in and reeling out the line, and a holder for mounting the reel unit to the fishing rod.

27 Claims, 6 Drawing Sheets

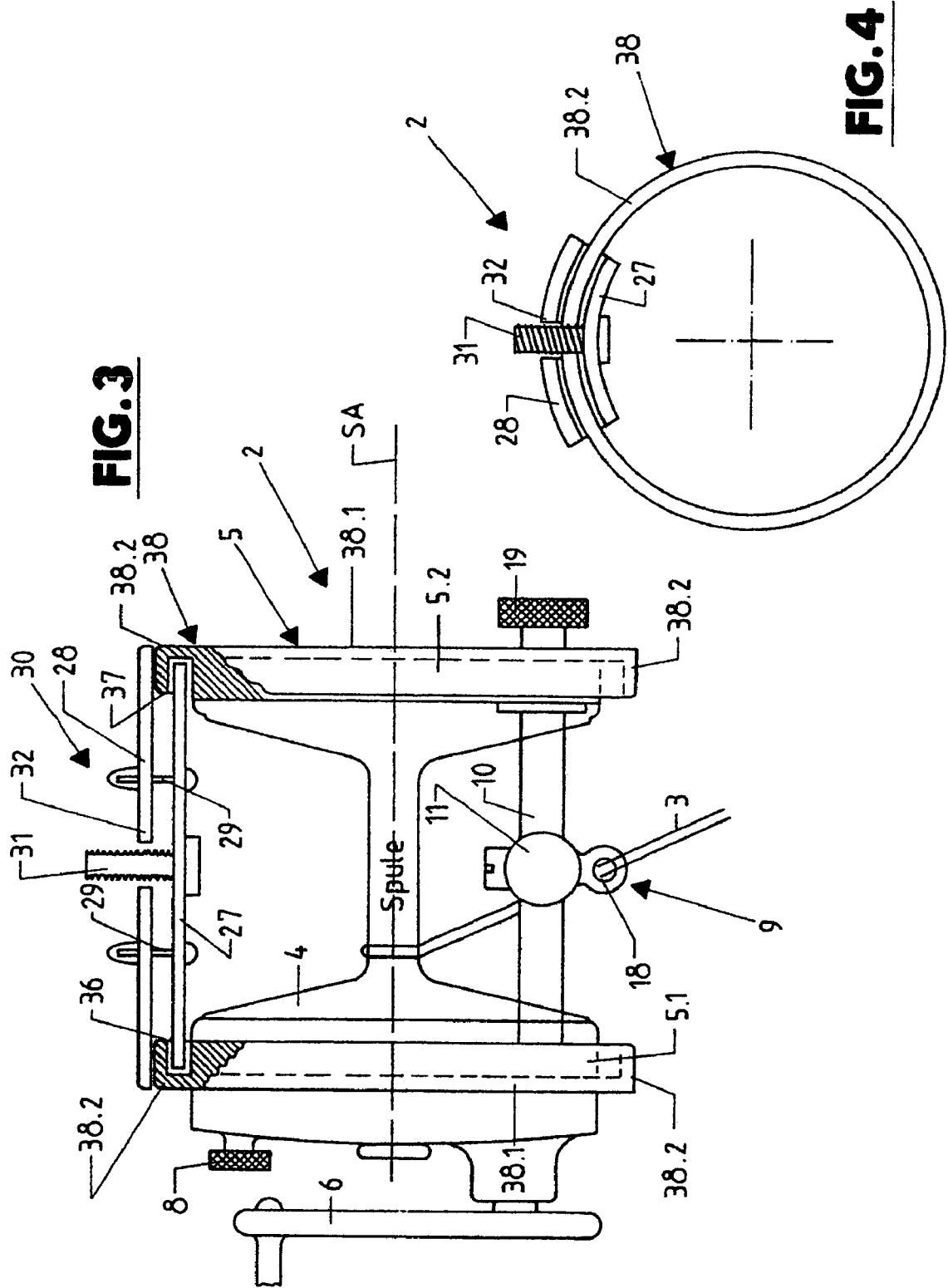

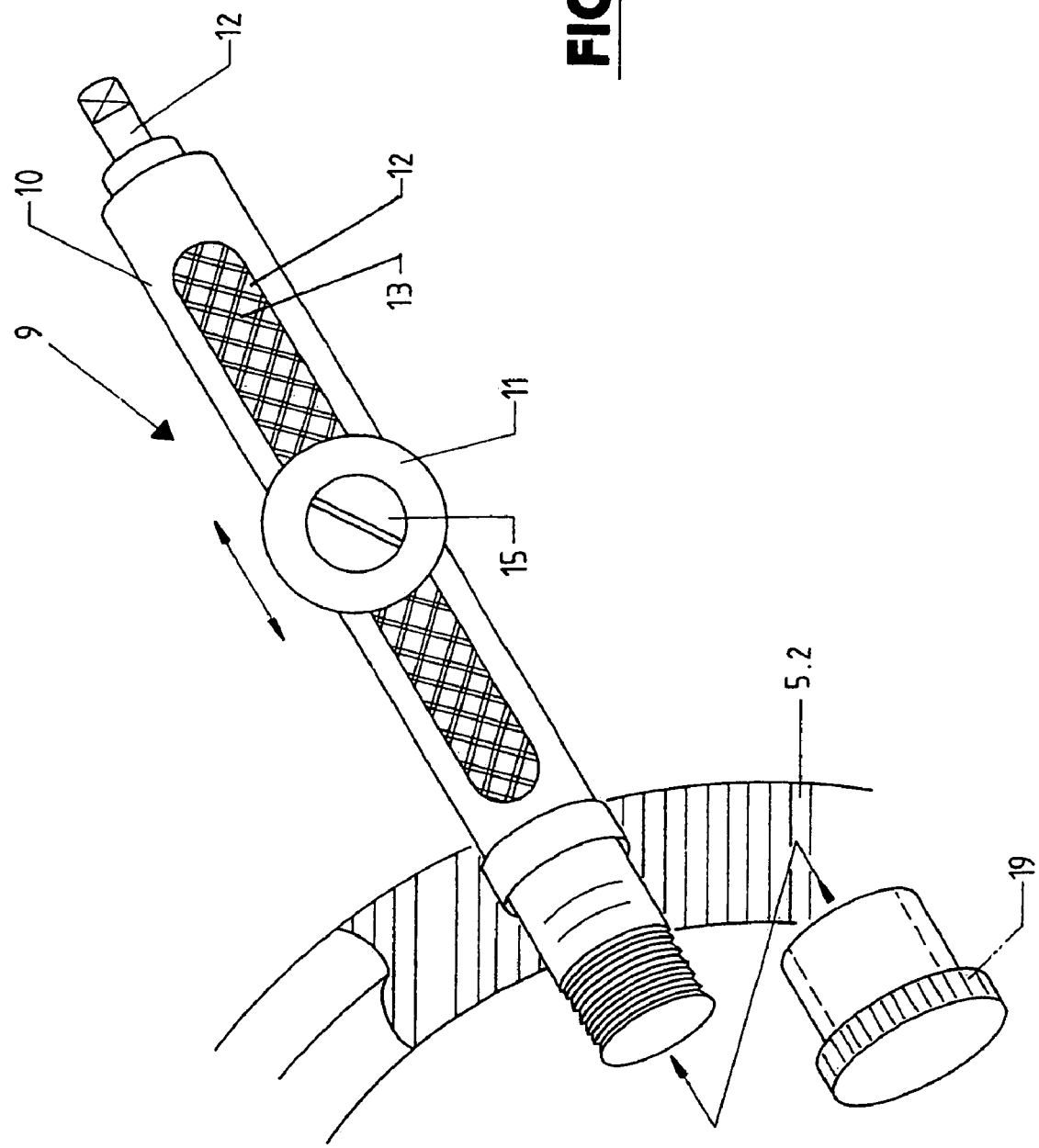

REEL UNIT FOR USE IN A FISHING ROD, HOLDER FOR A REEL UNIT AND FISHING ROD COMPRISING SAID REEL UNIT

BACKGROUND OF THE INVENTION

The invention relates to a reel unit (multi-reel) to a holder for a reel unit and to a fishing rod comprising such a reel unit.

Reel units for reeling in and reeling out a fishing line are known in various designs. In particular, reel units are also known in which the reel is provided on the fishing rod so that it can rotate on an axis, which is oriented perpendicular to a longitudinal axis of the plane enclosing the rod. The manual turning of the reel is effected by means of a crank that is provided on the side of a housing and that is connected by a driven gear unit to the reel. The gear unit is provided with a return stop, which can be manually released and when in non-released position enables turning of the reel for the purpose of reeling in the fishing line, but prevents the reel from turning in the opposite direction. If a line guide is present, it points forward.

Normally the reel unit is mounted upright, i.e. on top of the rod. The crank for manual actuation of the reel is located on the right side of the housing. This design was originally taken over from the United States, since many left-handers there hold the rod with the left hand and turn the crank with the right hand. For right-handers, who want to hold the rod with the right hand and turn the crank with the left hand, this design is unsuitable. With a reel mounted upright, the crank would have to be located on the left side of the housing. Therefore, different versions of the reel unit are necessary for left-handers and right-handers. The same applies if the reel unit is to be mounted suspended, i.e. beneath the rod. In this case, different versions are likewise necessary for left-handers and right-handers. If a line guide is provided, it is not possible to use a version intended for upright mounting of the reel for suspended mounting.

It is an object of the invention is to present a reel unit that enables all possible mounting variants, i.e. both for left-handers and right-handers and for upright or suspended mounting.

SUMMARY OF THE INVENTION

The invention enables adjustment of the reel unit by pivoting or turning on an axis parallel or approximately parallel to the axis of the reel. In this way, an existing line guide can be used and oriented in any mounting situation so that when the reel unit is fastened to the fishing rod, the line guide points forward, i.e. toward the end of the rod facing away from the handle end. The locking direction of an existing return stop can be switched. A further essential advantage of the design according to the invention is that all settings and adjustments can be performed without tools.

The line guide in the invention consists for example of a slide element guided on a guide, which (slide element) comprises at least one line aperture. By turning the guide, the slide element with the line aperture can be adjusted, so that the line can be evenly reeled up onto the reel with the line guide in the respective direction of rotation of the reel.

BRIEF DESCRIPTION OF THE DRAWINGS

Further embodiments of the invention are the subject of the dependant claims. The invention is described in more detail below based on exemplary embodiments with reference to the drawings, wherein:

FIG. 3 shows the reel unit together with the clamping jaws of the reel holder, partially in cross section;

FIG. 4 shows a simplified schematic view in cross section corresponding to the line I-I of FIG. 3, in which details of the reel unit are omitted for the sake of a clearer representation;

FIG. 5 shows an enlarged partial view of a sliding guide with a drive shaft (worm shaft) for a line guide;

DETAILED DESCRIPTION OF THE INVENTION

Figure 1:
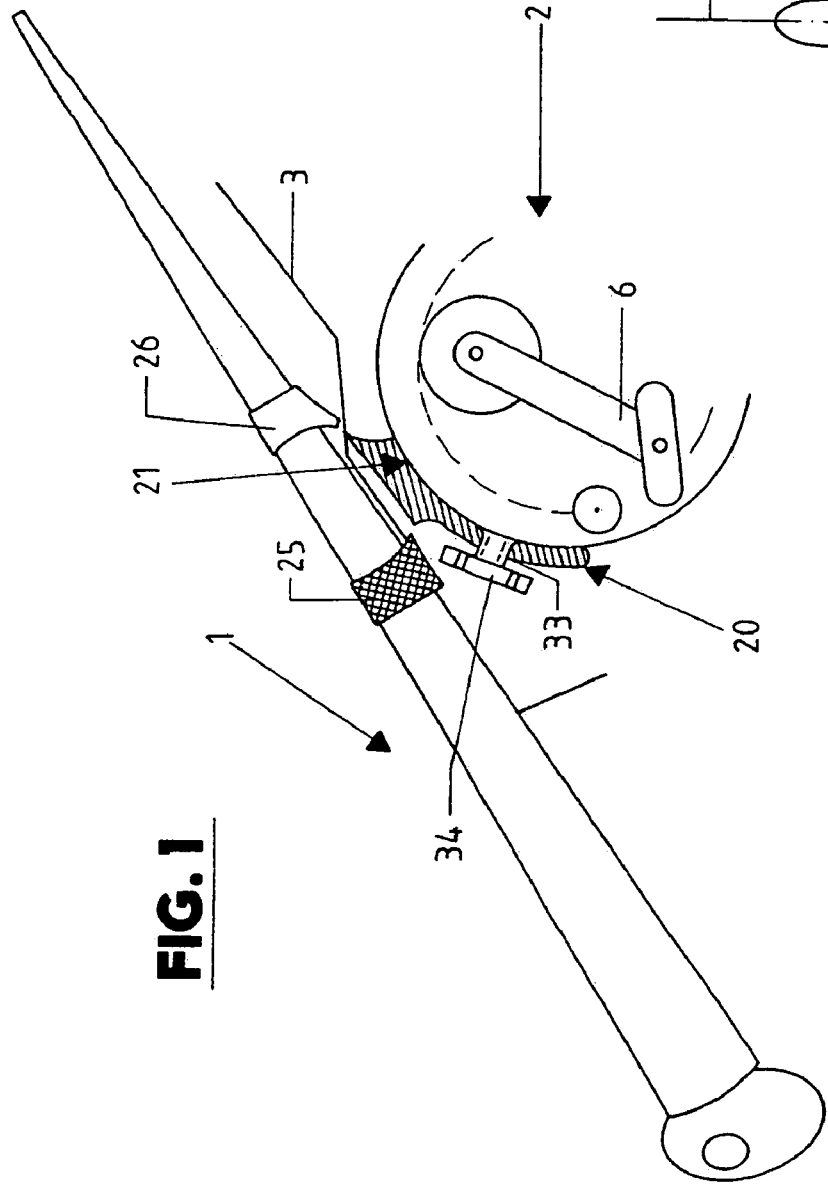
FIG. 1 shows a simplified representation in side view of a fishing rod together with a holder according to the invention and a reel unit or multi-reel according to the invention.

In the drawings, 1 designates a fishing pole, on which a winch or reel unit 2 s provided for reeling and unreeling fishing line. In the depiction in FIG. 1 the reel unit 2 is suspended on the rod 1, i.e. it is located on the bottom of the rod. Furthermore, the reel unit 2 is designed for a right-hander, i.e. it can be operated with the right hand of the user.

The reel unit 2 consists in the manner known in the art of a spool 4, which for reeling and unreeling the line 3 on a reel axis SA is rotatably mounted in a reel housing 5 or on two housing elements 5.1 and 5.2 forming said reel housing and offset against each other in the reel axis SA. The reel can be driven by means of a crank 6 on the outside of the housing 5.1 and by means of a non-depicted gear unit located in this housing section. The gear unit is equipped with a releasable return stop, which is generally designated 7 in FIG. 8 and which in the non-released state enables turning of the hand crank 6 and of the spool 4 for the purpose of reeling up the line 3, but can be released for reeling out the line 3 from the spool 4. Furthermore, the return stop is reversible by means of a rotary knob 8 provided on the outer surface of the housing element 5.1, so that the reel unit 2, in the manner described in more detail below, can be mounted for right-handers optionally on the bottom or top of the rod 1 and for left-handers, likewise optionally on the bottom or top of the rod 1.

Between the two housing elements 5.1 and 5.2, parallel to the reel axis SA, but offset from said axis and therefore radially outside the spool 4, a line guide 9 is provided, which consists in the known manner of an outer guide tube 10, a slide element 11 guided on the guide tube 10, a shaft 12 mounted rotatably in the guide tube and oriented on the same axis as the guide tube, which (shaft) is designed as a "worm shaft" with two crisscrossing spiral-shaped grooves 13 with a large pitch and which can be driven on its end extending into the housing element 5.1 by means of the gear unit and the hand crank. A guide element 14 provided on the slide element 11 engages in the control groove 13 of the shaft 12 and is provided in a retainer 16 formed by an extension of the slide element and can be closed by a cap 15.

On the side opposing the retainer 16 the slide element 11 forms a line eyelet 18 formed on a projection 17. The guide tube 10 can be rotated at least 180° on its axis by means of a locking screw 19 and fixed in the respective position by clamping, so that the line eyelet 18 can optionally be located on either side of a plane that is defined by the axis SA and the axis of the guide tube.

An essential component of the invention is the reel holder generally designated 20 in the drawings, with which the reel unit 2 can be mounted on the rod 1, not only optionally suspended on the bottom or upright on the top, with the crank on the left or right, but also with which the reel unit 2 can be rotated 360° for adjustment on the reel axis SA and clamped in the respective position, in particular so that for every type of mounting of the reel unit 2 on the fishing rod 1 and/or for operation or use by right-handers or left-handers, the line guide 9 is located in the correct position, i.e. on the side of the reel unit 2 facing away from the handle 1.1 of the rod. Adjusting the guide tube 10 accordingly ensures that the line eyelet 18 is in the necessary position in relation to the spool 4 for every adjustment position.

Figure 2:
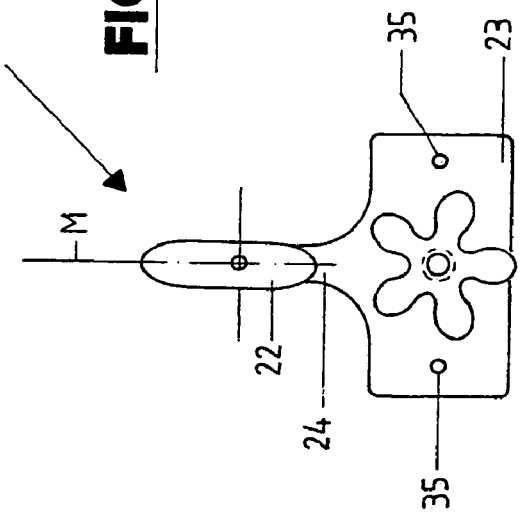
FIG. 2 shows a component drawing of the reel holder in top view.

The holder 20 consists of a base element 21, which is depicted in top view in FIG. 2 and is manufactured as one piece with a bracket 22, a clamping plate 23 and an arm 24 connecting the bracket 22 and the plate 23. In the depicted embodiment, the base element 21 is symmetrical to a middle plane M, in which also the longitudinal extension of the bracket 22 is located, which in the representation in FIG. 2 is located to the side of one longitudinal side of the rectangular plate 23. The holder 20 can be fastened to the rod 1 with the bracket 22, namely in the usual manner for reel units using two retainer rings 25 and 26, each of which forms a matching retainer for one end of the bracket 22 and between which the bracket 22 can be clamped after being inserted into the retainers, so that the base element 21 is then held contiguously with the bracket 22 against the outer surface of the rod 1, and the arm 24 with the plate 23 protrudes from the bracket 22.

The plate 23 is curved on its side facing away from the bracket 22 on an axis that is perpendicular to the middle plane M, namely with a radius of curvature that at least approximately corresponds to the radius of curvature of the housing elements 5.1 and 5.2 on the outside, which have the same diameter and are disk-shaped at least on the outside. The holder consists furthermore of two clamping jaws 27 and 28, which likewise are plate-shaped and slightly curved or convex, again with a radius of curvature that at least approximately corresponds to the radius of curvature of the outer ring surface of the housing elements 5.1 and 5.2 on their periphery. The two plate-shaped clamping jaws 27 and 28, which in the depicted embodiment are of approximately the same size, are located one above the other in the manner of a packet and are connected with each other by guide or locking pins 29, so that the distance between the two clamping jaws 27 and 28 is variable within certain limits, while the two clamping jaws form a clamping jaw unit 30.

In the middle of one clamping jaw, namely on the clamping jaw 27, the convex side of which is adjacent to the concave side of the clamping jaw 28, there is a threaded bolt 31, which passes through a bore hole 32 in the middle of the clamping jaw 28 and protrudes over the convex side of the clamping jaw 28 facing away from the clamping jaw 27. A female threaded element 33 that can be turned with a hand wheel is provided on the plate 23 of the base element 21. The female threaded element 33 can be used to screw the clamping jaw unit 30 to the concave side of the plate 23 of the base element 21, so that the two clamping jaws 27 and 28 can also be braced against each other. The plate 23 has bore holes 35 for the locking pins 29.

For mounting on the holder 20 the two housing elements 5.1 and 5.2 are provided on their periphery with a ring groove 36 and 37 concentrically enclosing the axis of the housing elements or the reel axis SA, which (grooves) are open toward the inside of the housing elements 5.1 and 5.2, i.e. toward the space formed between said housing elements and accommodating the spool 4. With the reel unit 2 fastened to the holder 20, the clamping jaw 27 designed as a rectangular plate extends with one narrow side into the ring groove 36 in the housing element 5.1 and with the other narrow side into the ring groove 37 in the housing element 5.2. The clamping jaw 28 bears in the area of its two narrow sides against the ring-shaped outer surface of the housing element 5.1 and of the housing element 5.2. After tightening the female threaded element 33, the reel unit 2 is then fixed to the fishing rod 2 by means of the clamping jaw unit 30 and the base element 21 and by means of the holder 20, so that the reel axis SA is oriented perpendicular to a plane enclosing the longitudinal axis of the fishing rod 1 and perpendicular to the middle plane M of the holder 20. By slightly releasing the female threaded element 33, the reel unit 2 can be adjusted by turning on the reel axis SA to the respective desired or required position.

The two ring grooves 36 and 37 are formed for example by a corresponding shaping of the housing elements 5.1 and 5.2 or by a particular shaping of covers of these housing elements, or by fastening a ring 38 on the outer surface of the disk-shaped housing element, which (ring) comprises one first ring section 38.1 extending in a plane perpendicular to the ring axis and an outer cylindrical ring section 38.2 concentrically enclosing the ring axis. The ring section 38.1 is used to fasten the respective ring 38 on the outer surface of the housing element 5.1 and 5.2. With the reel unit fastened to the fishing rod 1, the ring section 38.2 is held between the two clamping jaws 27 and 28.

Figure 7:
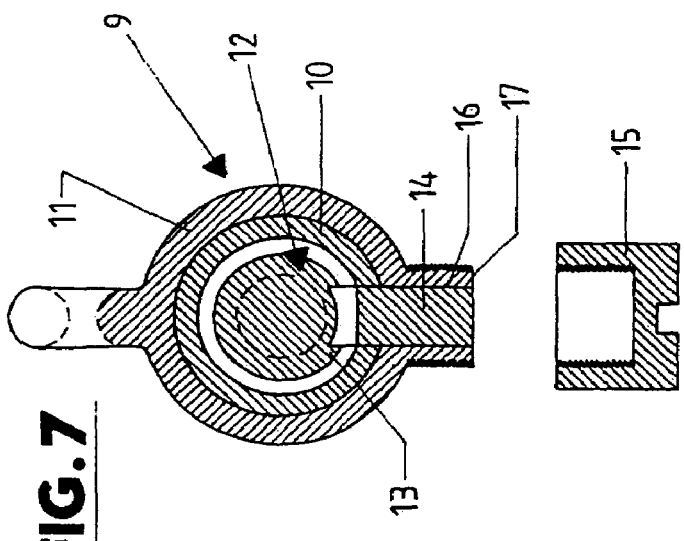
FIG. 7 shows a cross section through the guide tube, the drive shaft and the line guide guided on the guide tube.
Figure 8:
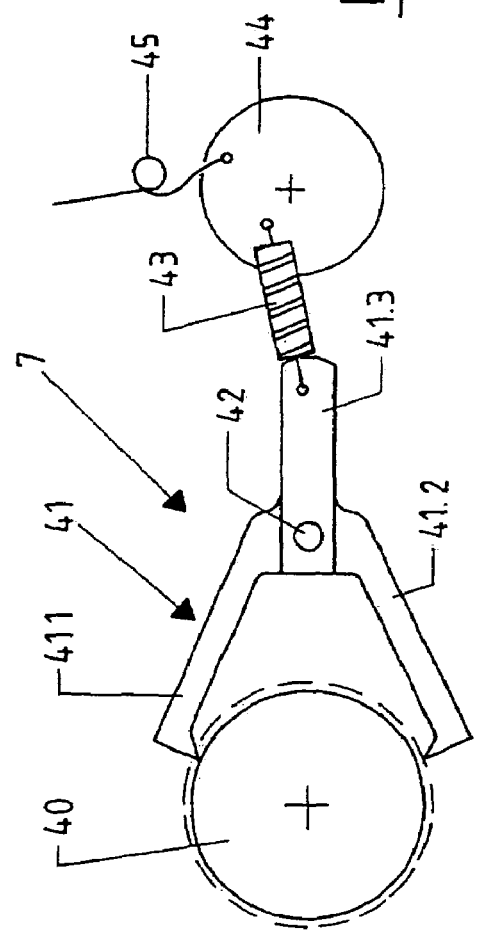
FIG. 8 shows a very schematic representation of the reversible return stop of the winch or multi-reel.

FIG. 8 shows in a very simplified representation a possible embodiment of the reversible return stop 7. This return stop consists essentially of a ratchet wheel 40 and a catch 41. The catch 41, which is pivot-mounted at 42, comprises two fork arms 41.1 and 41.2, between which the ratchet wheel 40 is located so that in one pivot position the catch 41 with its catch arm 41.1 prevents the ratchet wheel 40 from turning in one direction, i.e. in the depiction of FIG. 7 clockwise and allows turning in the other direction, i.e. counter-clockwise, while in the other position, the catch 41 with its catch arm 42.2 prevents the ratchet wheel 40 from turning counter-clockwise and allows it to turn clockwise. On one end 41.3 facing away from the catch arms 41.1 and 41.2 in relation to the pivot point 42, the catch 41 is connected with a rotary link 44 by means of a spring 43. The rotary link 44 is located on an axis on which the rotary knob 8 is also provided. Turning the rotary link 44 or the rotary knob 8 causes the housing-side contact point of the spring 43 to shift so that the catch 41 is moved from one position, in which for example the arm 41.1 is engaged with the ratchet wheel 40, into the other position, in which the arm 42.2 is engaged with the ratchet wheel 40. A further spring 45, by means of the over dead center effect, achieves that the rotary link 44 can assume only two end positions. Of course, other options for reversing the return stop 7 are also possible. The return stop features a release not yet depicted.

Figure 6:
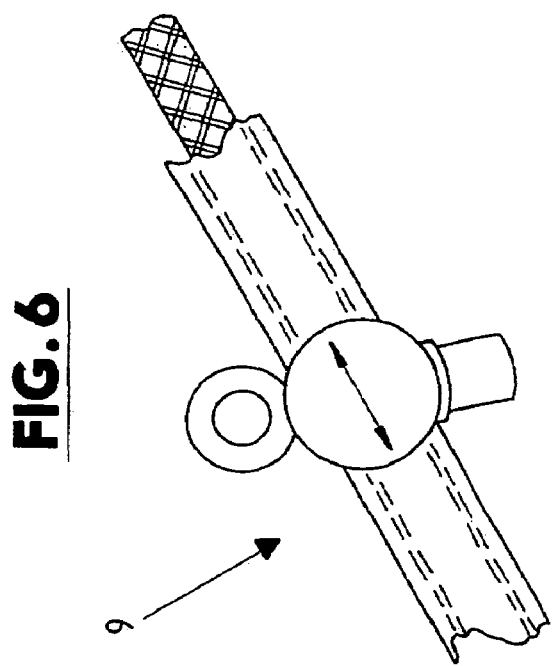
FIG. 6 shows a partial view of the sliding guide, together with the corresponding line guide in another side view.
Figure 9:
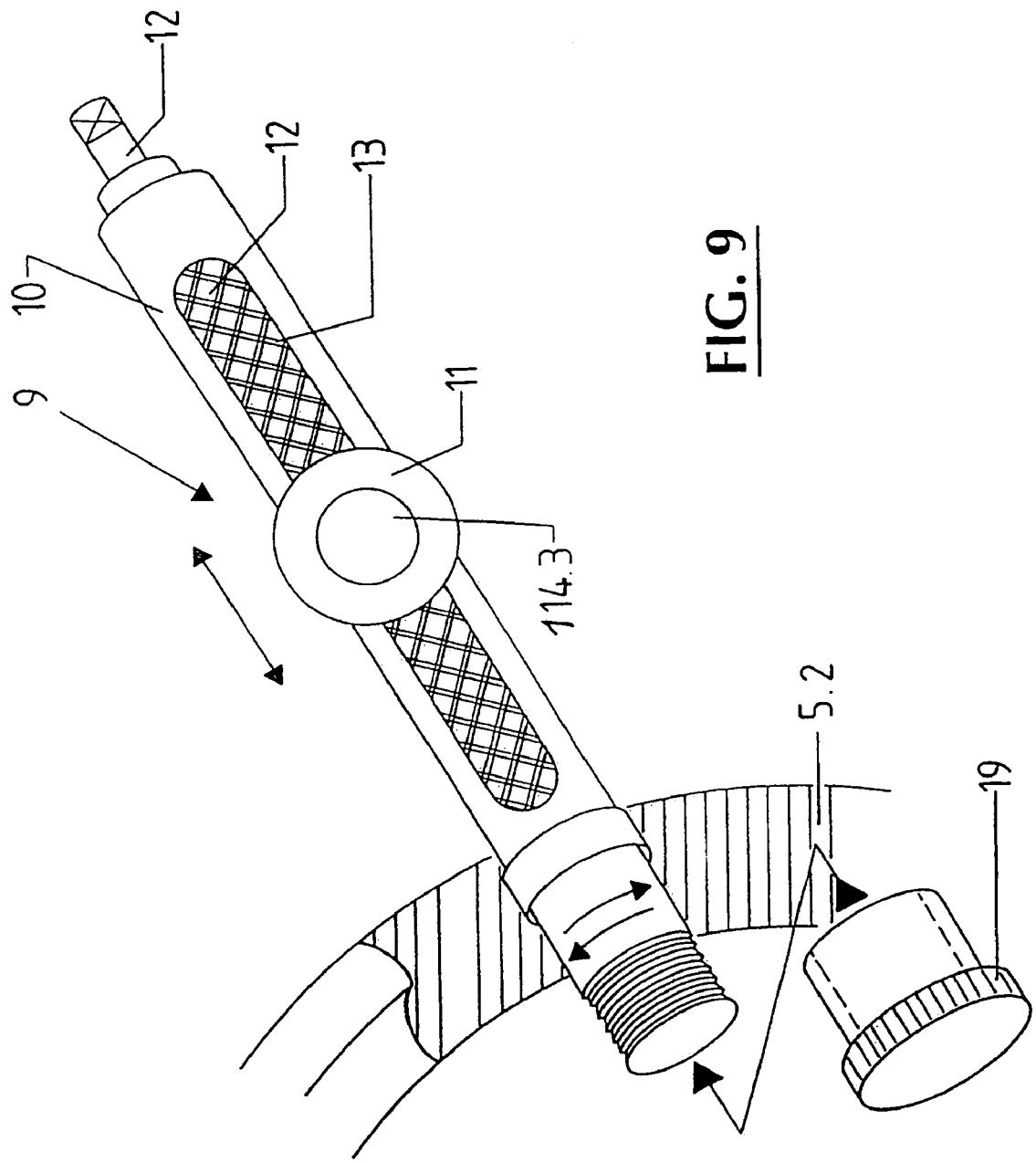
FIG. 9-11 show depictions similar to FIG. 5-7 of a further embodiment.
Figure 11:
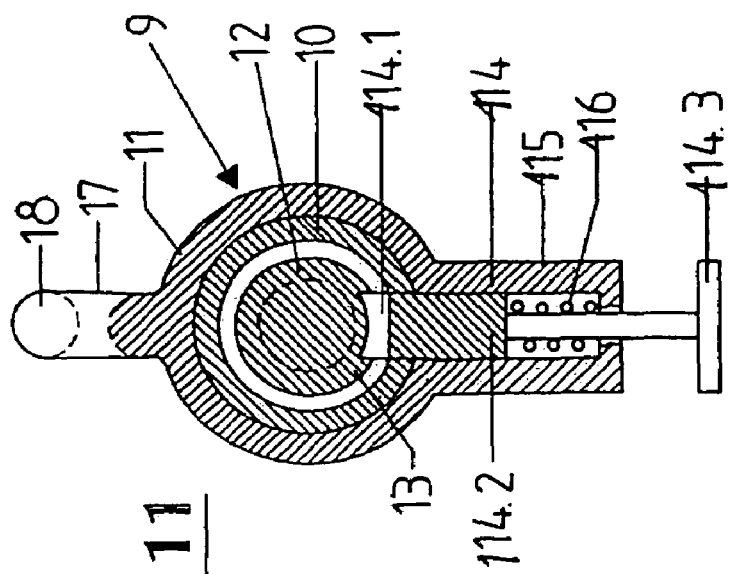
Figure 10:
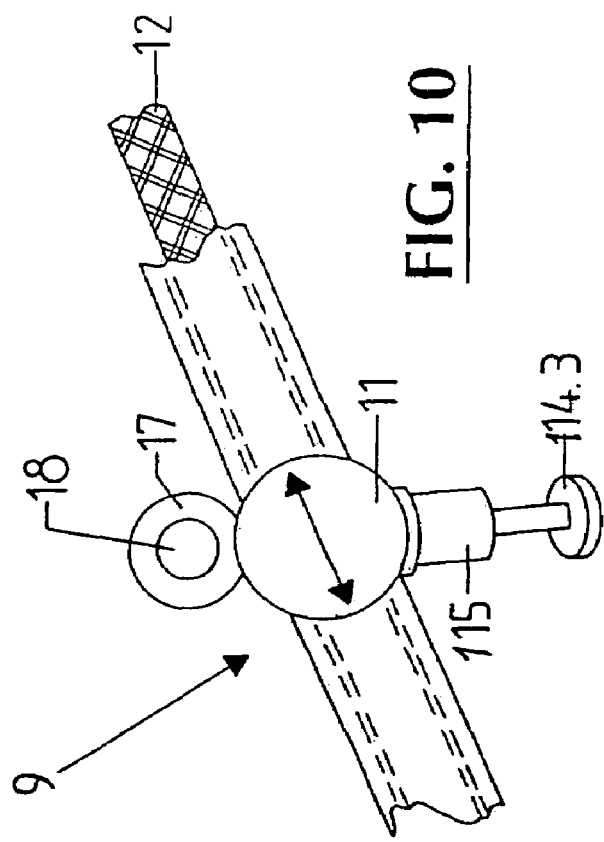

FIGS. 9-11 show representations similar to FIGS. 6-8 of a further possible embodiment with a quick-release mechanism for the slide element 11 comprising the line eyelet.

In this embodiment, a guide element 114.1, which is formed by one pin-shaped end of a bolt 114 and is provided on the slide element 11, engages in the control groove 13 of the shaft 12. Said bolt can be moved axially and radially to the shaft 12 on a retainer 115 formed by an extension of the slide element, namely with a section 114.2 with an enlarged cross section. A spring 116 pre-tensions the bolt 114 in the direction of the shaft 12, so that the guide element 114.1 reliably engages in the spiral grooves 13 of the shaft 12. The bolt 114 is provided on one radially outward end with a handle 114.3. By pulling on said handle 114.3 against the force of the spring 116 the guide element 114.1 can easily be disengaged from the shaft 12, thus enabling movement of the slide element 11 in the longitudinal direction of the guide tube 10. After releasing the handle element 114.3 the guide element 114 in turn catches in one of the crisscrossing spiral grooves 13.

On the side opposing the retainer 115 the slide element forms a projection 117 with the line eyelet 18. To adjust the line eyelet 18 in the axis direction of the guide tube 10 and therefore in the direction of the axis SA, the guide element 114 is disengaged from the shaft 12 by pulling on the handle element 114.3, so that also after repairing a broken fishing line 3, it is possible to continue winding the fishing line 3 closely adjoining the last windings of the line on the spool 4 through corresponding axial adjustment of the line eyelet 18.

The invention was described above based on an exemplary embodiment. It goes without saying that numerous modifications and variations are possible without abandoning the underlying inventive idea upon which the invention is based.

REFERENCE LIST 1 fishing rod
2 reel unit
3 fishing line
4 line spool
5 housing
5.1, 5.2 housing element
6 crank
7 return stop
8 rotary knob for reversing the return stop
9 line guide
10 guide tube
11 slide element
12 worm shaft
13 groove
14 guide element
15 cap
16 retainer
17 projection
18 line eyelet
19 clamp nut
20 holder
21 base element
22 bracket
23 plate
24 arm
25, 26 retaining ring
27, 28 clamping jaws
29 locking pin
30 clamping jaw unit
31 threaded shaft
32 bore hole
33 female threaded element
34 hand wheel
35 bore hole for locking pin
36, 37 ring groove
38 ring
38.1, 38.2 ring section
40 ratchet wheel
41 catch
41.1, 41.2 catch arm
41.3 end of catch
42 bearing
43 catch spring
44 bearing element for spring 43 or rotary link
45 spring
114 bolt
114.1 guide element
114.2 bolt section
114.3 handle element
115 retainer
116 spring
SA reel axis
M middle plane of base element 21

What is claimed is:

1. A reel unit for a fishing line for use on a fishing rod, comprising a housing, a spool rotatably mounted on the housing that can be rotated via a gear unit by means of a hand crank for reeling in and reeling out the line, and a holder for mounting the housing of the reel unit to the fishing rod, wherein the reel unit can be adjusted on the holder by turning or pivoting the housing on an axis (SA) parallel or approximately parallel to the axis of the spool of the reel unit.

2. The reel unit according to claim 1, wherein at least one line guide with a slide element with a line guided on a guide parallel to the axis of the reel is provided on the housing and that the slide element or the line eyelet can pivot by at least 180° on the axis of the guide.

3. The reel unit according to claim 2, wherein the at least one line eyelet on the slide element is radially offset from the guide and that the slide guide with the slide can be adjusted by turning or pivoting on the axis of the guide.

4. The reel unit according to claim 1, wherein at least one line guide with a slide element guided on a guide parallel to the axis of the reel is provided, that at least one line eyelet radially offset from the guide is provided on the slide element and that the slide guide with the slide can be adjusted by turning or pivoting on the axis of the guide.

5. The reel unit according to claim 1, wherein the housing is formed by at least two housing, between which the reel is rotatably mounted.

6. The reel unit according to claim 1, wherein the housing or its housing elements are adjustably connected with the holder on the housing periphery.

7. The reel unit according to claim 1, wherein the holder comprises at least two clamping jaws for clamping the housing or the housing elements.

8. The reel unit according to claim 7, wherein the clamping jaws extend in an axis direction parallel or approximately parallel to the reel axis (SA) between the housing elements.

9. The reel unit according to claim 1, wherein the housing or its housing elements, in the peripheral area of the housing, comprise at least two housing sections that can be clamped between said at least to clamping jaws.

10. The reel unit according to claim 9, wherein the housing sections are each formed by wall sections of a ring groove.

11. The reel unit according to claim 9, wherein the housing sections are each formed by one section of a supporting ring.

12. The reel unit according to claim 1, wherein the gear unit drivably connecting the crank with the reel comprises a return stop and that the locking direction of the return stop is reversible.

13. The reel unit according to claim 1, wherein the housing can be clamped to the holder by means of screws.

14. A fishing rod, comprising a reel unit according to claim 1.

15. The reel unit according to at least one line guide provided on the housing with a slide element guided on a guide parallel to the axis of the reel, on which slide element at least one line eyelet and one guide element are provided, which engages with at least one spiral-shaped guide on a shaft that can be driven via the gear unit, wherein the guide element can be moved manually from a state of being engaged with the guide to a state in which the guide element is outside of the at least one spiral-shaped guide.

16. The reel unit according to claim 15, wherein the guide element is pre-tensioned by at least one spring element for engaging in the at least one guide.

17. The reel unit according to claim 15, wherein the guide element is formed by a bolt, which is pre-tensioned in its engaged state by the at least one spring element.

18. The reel unit according to claim 15, wherein the guide element is connected with a handle element.

19. The holder according to claim 15, wherein the holder can be mounted on the housing periphery.

20. The holder according to claim 15, wherein the holder comprises at least two clamping jaws for clamping to the housing periphery.

21. A reel unit for a fishing line for use on a fishing rod, comprising a housing, a spool rotatably mounted on the housing that can be rotated via a gear unit by means of a hand crank for reeling in and reeling out the line, and a holder for mounting the reel unit to the fishing rod, whereby at least one line guide provided on the housing with a slide element guided on a guide parallel to the axis of the reel, on which slide element at least one line eyelet and one guide element are provided, which engages with at least one spiral-shaped guide on a shaft that can be driven via the gear unit, wherein the guide element can be moved manually from a state of being engaged with the guide to a state in which the guide element is outside of the at least one spiral-shaped guide and wherein the gear unit drivably connecting the crank with the reel comprises a return stop and the locking direction of the return stop is reversible.

22. The reel unit according to claim 21, wherein the guide element is pre-tensioned by at least one spring element for engaging in the at least one guide.

23. The reel unit according to claim 21, wherein the guide element is formed by a bolt, which is pre-tensioned in its engaged state by the at least one spring element.

24. The reel unit according to claim 21, wherein the guide element is connected with a handle element.

25. The reel unit according to claim 21, wherein the reel unit can be adjusted on the holder by turning or pivoting on an axis (SA) parallel or approximately parallel to the axis of the reel.

26. The reel unit according to claim 21, wherein at least one line eyelet on the slide element is radially offset from the guide and that the slide guide with the slide can be adjusted by turning or pivoting on the axis of the guide.

27. A holder for a reel unit for use on a fishing rod, wherein the reel unit comprising a housing and a spool rotatably mounted on the housing and wherein the reel unit can be adjusted on the holder, namely by turning or pivoting on an axis (SA) parallel or approximately parallel to the axis of a spool of the reel unit.

* * * * *